(12) United States Patent
Hong et al.

(10) Patent No.: US 7,463,248 B2
(45) Date of Patent: Dec. 9, 2008

(54) SYSTEM AND METHOD FOR CONSTRUCTING OPTICAL DEVICES USING FOLD-UP PORTIONS EXTENDED FROM A SUBSTRATE

(75) Inventors: Yee Pak Hong, Singapore (SG); Ng Peng Yam, Singapore (SG); Tan Wee Sin, Singapore (SG); Tan Soon Lee, Singapore (SG); Chen Deng Peng, Singapore (SG); Rani Saravanan, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 543 days.

(21) Appl. No.: 11/098,714

(22) Filed: Apr. 4, 2005

(65) Prior Publication Data
US 2006/0221065 A1    Oct. 5, 2006

(51) Int. Cl.
G06F 3/042 (2006.01)
(52) U.S. Cl. ............... 345/175; 345/173; 178/18.04
(58) Field of Classification Search ......... 345/156–169, 345/173–184; 178/18.09, 18.01–18.07, 19.01–19.06
See application file for complete search history.

(56) References Cited

U.S. PATENT DOCUMENTS 6,005,556 A * 12/1999 Kodama et al. ............. 345/175
6,333,735 B1 * 12/2001 Anvekar ..................... 345/175
6,429,857 B1 * 8/2002 Masters et al. .............. 345/175
6,697,130 B2 * 2/2004 Weindorf et al. ............. 349/65
7,098,592 B2 * 8/2006 Nishikawa ................... 313/506
2004/0233641 A1 * 11/2004 Moshayedi ................. 361/716

FOREIGN PATENT DOCUMENTS

| JP | 2001-166874 | 6/2001 |
|---|---|---|
| JP | 2001-168272 | 6/2001 |
| WO | WO 01/99044 | 12/2001 |
| WO | WO 2006/022404 | 3/2006 |

OTHER PUBLICATIONS

UK Search Report dated Jul. 13, 2006 involving counterpart UK application No. GB0606388.7.

* cited by examiner

*Primary Examiner*—Vijay Shankar

(57) ABSTRACT

In one embodiment, the transmitters and detectors for an integrated optical touch panel (OTP) are mounted at right angles to the surface of the OTP. The transmitters and detectors are contained on a substrate which is an extension of the substrate containing the touch panel display itself. The sides of the substrate containing the transmitters and detectors are folded upward so that the transmitters and detectors are positioned above the plane of the substrate containing the display.

14 Claims, 4 Drawing Sheets

SYSTEM AND METHOD FOR CONSTRUCTING OPTICAL DEVICES USING FOLD-UP PORTIONS EXTENDED FROM A SUBSTRATE

BACKGROUND OF THE INVENTION

Portable personal devices, such as mobile telephone handsets and PDAs etc., are becoming smaller. These devices typically use integrated optical touch panels (OTP) functioning with icons and virtual keypads thereby saving space by eliminating the mechanical keypad.

The transceivers of conventional OTPs are made-up of transmitters (typically Light Emitting Diodes or Laser Diodes) and detectors (typically Photo Diodes or PIN Diodes) operating in conjunction with a display device (typically a liquid crystal display (LCD)). Since the signals (light, etc.) from the transmitters to the detectors must pass above the surface of the display, the transceiver elements (transmitters and detectors) are mounted above the plane of the display. This, then, requires the transceiver elements to be mounted on risers that are at right angles to the plane of the display. Presently, manufacturing processes require separately constructed risers that are then attached to the sides of the display. This construction is costly, from both the material and building time standpoints. Also alignment of the transmitters with the detectors and with the display surface presents problems.

SUMMARY

In one embodiment, the transmitters and detectors for an integrated optical touch panel (OTP) are mounted at right angles to the surface of the OTP. The transmitters and detectors are contained on a substrate which is an extension of the substrate containing the touch panel display itself. The sides of the substrate containing the transmitters and detectors are folded upward so that the transmitters and detectors are positioned above the plane of the substrate containing the display.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
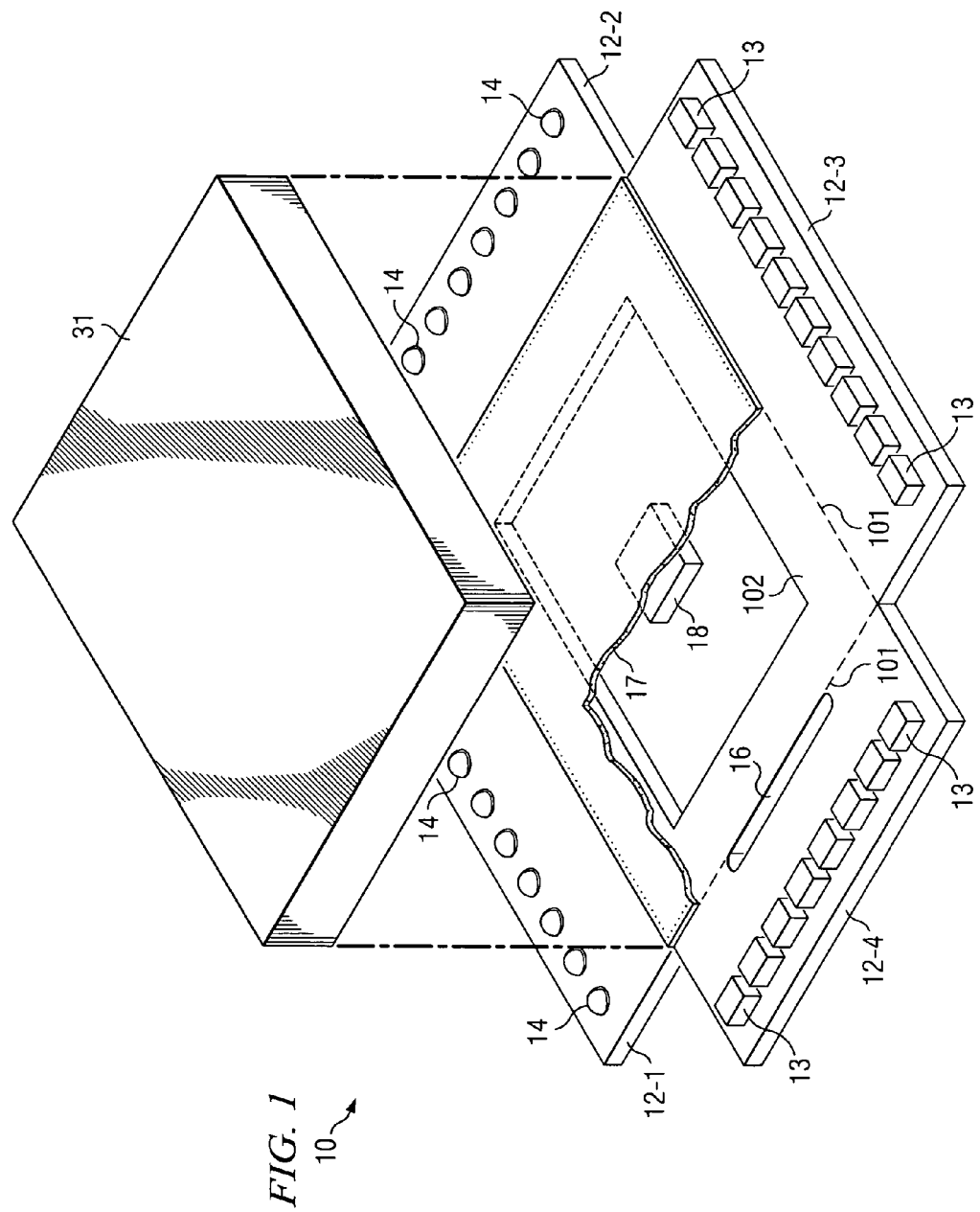
FIG. 1 shows an exploded perspective view of an optical touch panel employing the concepts of the invention.

FIG. 1 shows a perspective view of an optical touch panel (OTP) 10 employing the concepts of the invention. Sides 12-1, 12-2, 12-3, and 12-4 are shown as they are initially constructed prior to being folded upward around display 31. Display 31, which can be a LCD or any other display type, is shown exploded upward so as to expose optional stiffener 17 and controller 18. Display 31 has thereon a plurality of logos, or keys, or text (soft buttons), and during operation the user's finger (or a stylus) would select the desired pattern and "press" on the display. The finger would then interrupt two light beams (13, 14) thereby yielding the position of the touch. Stiffener 17 is used as an aide to bending sides 12-1 through 12-4 which are bent along broken line 101. Mounted on sides 12-3 and 12-4 are light sources, such as LEDs 13, while mounted on opposing sides 12-1 and 12-2, respectively, are optical detectors, such as photo detectors 14. Mounted beneath bottom surface 102 of device 10 can be, for example, controller 18 which controls display 31 and/or the LCDs and detectors. This controller could connect to display 31 via cable 21, shown in FIG. 2, that extends through slot 16, if desired.

Figure 2:
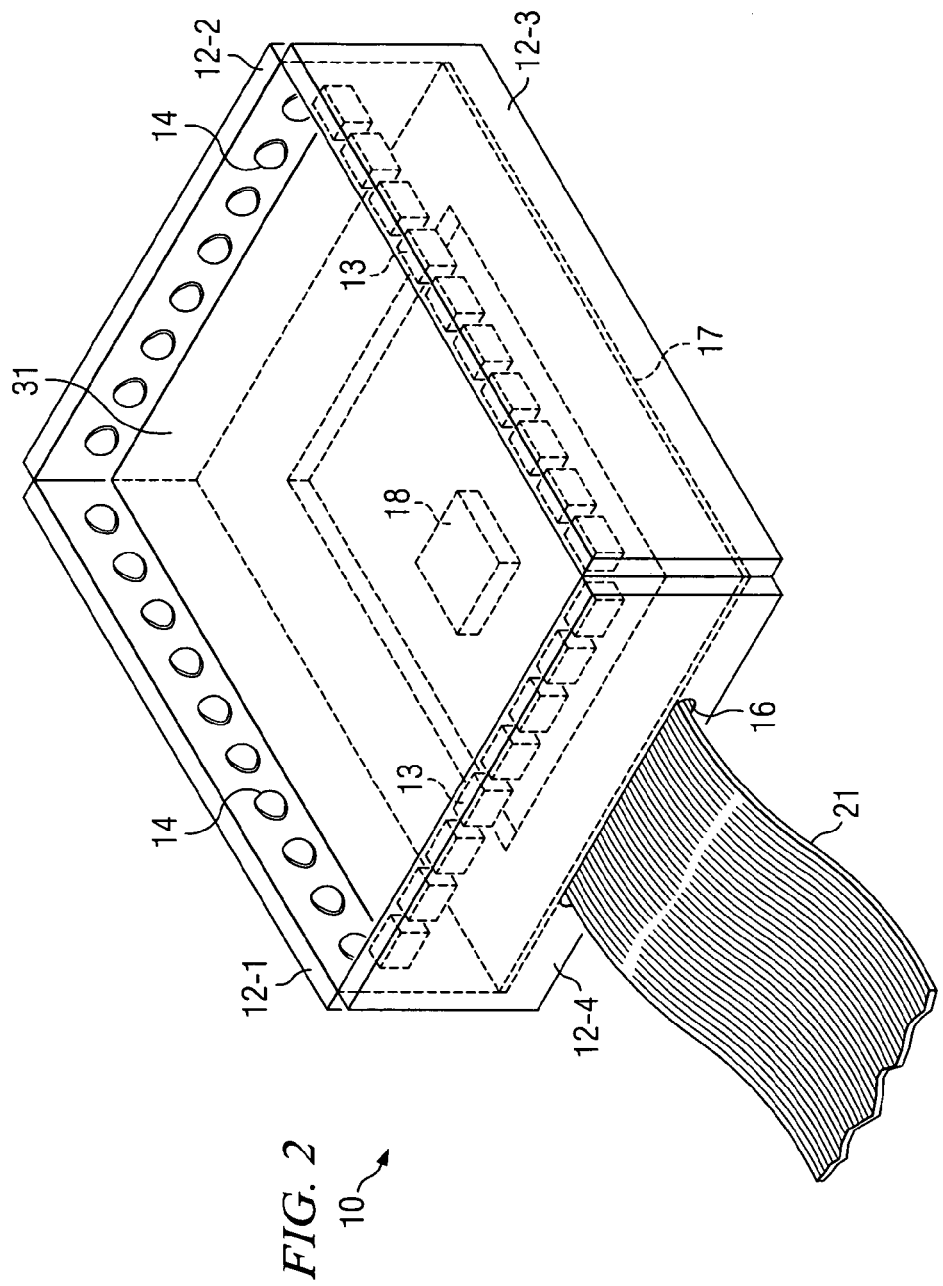
FIG. 2 shows the sides of the optical touch panel of FIG. 1 fully folded upward.

FIG. 2 shows sides 12-1, 12-2, 12-3, and 12-4 folded completely up around LCD 31. Optical signals from a LED mounted or side wall 12-3 impacts a detector mounted on opposite side wall 12-1 while optical signals from a LED on side wall 12-4 impacts detectors on side wall 12-2. These optical signals travel above the surface of LCD 31 and when broken (by a finger or stylus) serve to determine the position of a touch as is well-known.

Sides 12-1 to 12-4 upon which the transmitters and detectors are mounted can be aligned by the original artwork patterning of substrate 102 to achieve accurate transceiving. The vertical position can be maintained by sandwiching between internal walls 401 of casing 40 (shown in FIG. 4) and LCD sides, and with this positioning can be further stabilized with adhesive after assembly into the actual mobile device.

Some of the advantages of this arrangement are that all of the components can be surface mounted at one time on a single flex circuit, and the assembly can be handled by a standard doubled sided flexible circuit board assembly line. By using flex circuits thinner and more flexible devices can be achieved. In addition, flexible circuits yield higher solder joint reliability than does the existing rigid-flex process.

Figure 3:
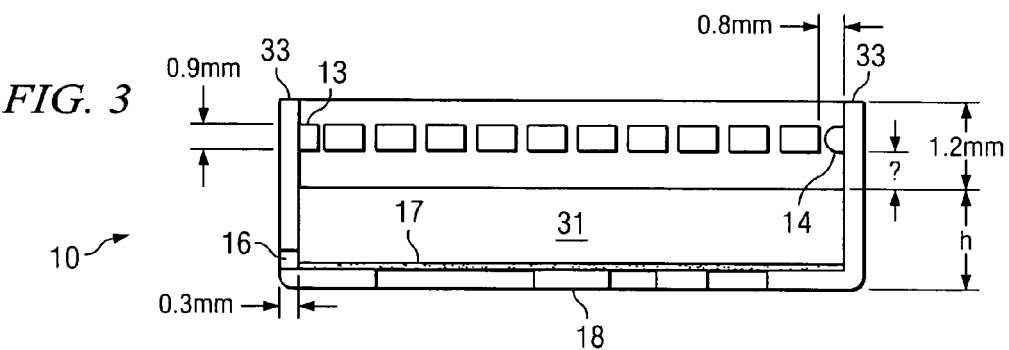
FIG. 3 shows a cut-away side view of the optical touch panel of FIG. 1.

FIG. 3 shows a cut-away side view of OTP 10 with controller 18 mounted below LCD 31. Controller 18 can also be mounted below LCD 31, if desired. Controller 18 is connected to LEDs 13 and photo diodes 14 by wires (not shown). Note that the distance 'h' from the bottom of the assembly to the top of LCD 31 is the thickness of LCD 31 plus approximately 0.3 mm, which is the thickness of the substrate. This dimension will vary depending on the application. In one embodiment the height of the device is 1.2 mm above the dimension 'h' leaving a gap between the top surface of LCD 31 and the bottom of the LCDs. Note that the dimensions shown are for illustration purposes only and any set of dimensions can be used. The dimensions shown are for a typical mobile phone and could be larger or smaller for other applications, such as PDAs, pagers, and the like.

Figure 4:
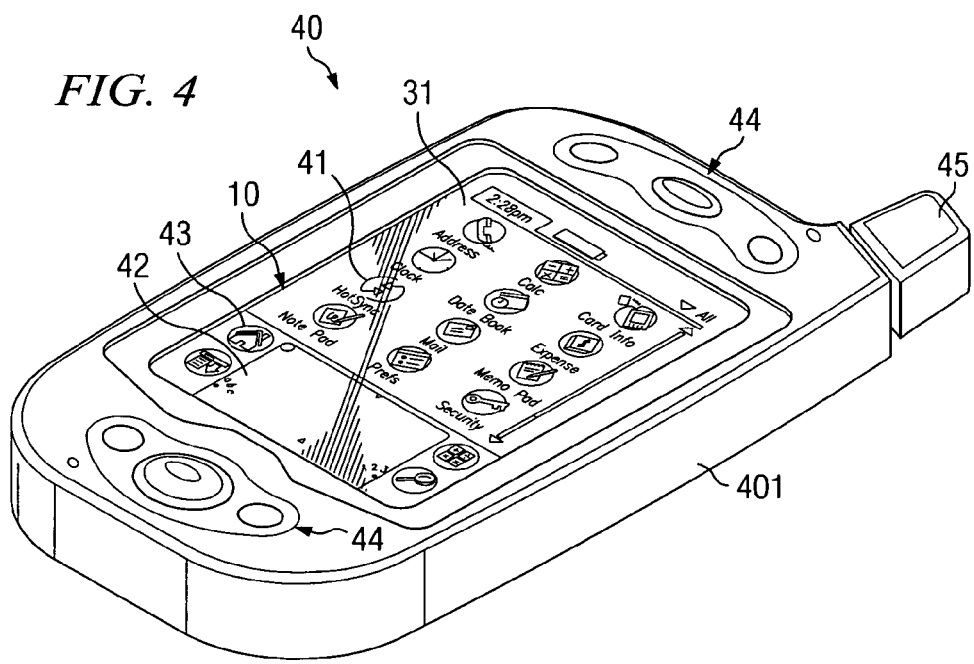
FIG. 4 shows an optical touch panel being used in an electronic device.

FIG. 4 shows optical touch panel 10 within device 40. Device 40, in the embodiment, is a pager, but it could be any electronic device (such as a cell phone) having a display. Shown on touch panel 10 are icons 41 appearing on surface 31. These icons, if desired, could be touch sensitive buttons which are changed in the well-known manner, from time to time. Not shown within housing 40 are, if desired, grooves on the inside of sidewall 401 for positioning optical touch panel 10 therein. Device 40 is shown with antenna 45, hard buttons 44, writing screen (or keypad) 42, and buttons 43. As consumer devices become smaller the likelihood that optical touch panel 10 would perform both keypad and display functions is increased. If used as a keypad, an image of a keypad would be created on the screen.

Figure 5:
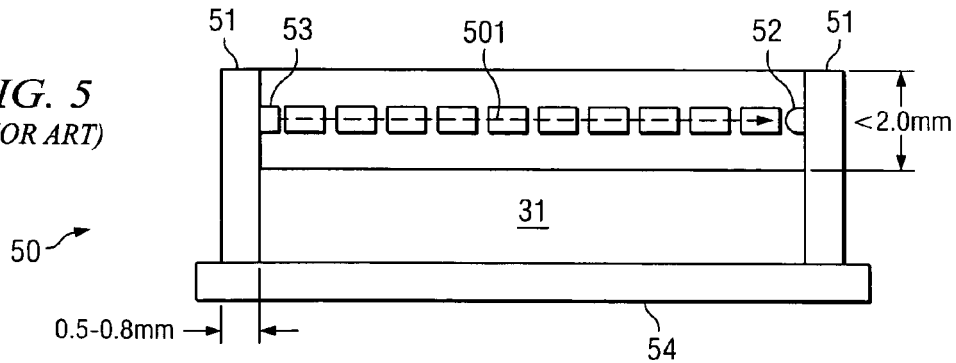
FIG. 5 shows one embodiment of a prior art optical touch panel.

FIG. 5 shows one embodiment of the prior art in which discrete risers 51 are mounted to substrate 54. In this embodiment LED 53 and photo diode 52 are mounted to the rigid risers and the optical signals follow path 501.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electronic device, comprising:
   an optical touch panel (OTP);
   a housing having an opening disposed therein for receiving the OTP;
   a substrate having mounted on a central portion thereof at least a screen portion of the OTP;
   the screen portion having a top surface raised a distance "h" above the substrate; and
   the substrate comprising peripheral portions upon which are mounted light emitting devices and light detecting devices, each of the peripheral portions having a width greater than the dimension "h" such that the light emitting devices and the light detecting devices are initially mounted outwardly from the dimension "h" on the peripheral portions, and wherein when the peripheral portions are folded upwardly the light emitting devices and the light detecting devices are operably configured and aligned respecting one another to communicate light from the light emitting devices to the light detecting devices above the surface of the screen such that a location of a user's finger placed on the screen can be determined.

2. The device of claim 1, further comprising:
   a stiffener mated to the central portion of the substrate.

3. The device of claim 1, further comprising:
   structure disposed within the housing configured to mate with the folded edges of the substrate such that when the housing is mated with the OTP the light emitting devices and the light detecting devices are concealed by the housing.

4. The device of claim 1, further comprising:
   means for aligning light from the light emitting devices such that the light is directed towards at least one light detecting device in the absence of the user's finger.

5. The device of claim 4, further comprising:
   means for determining the position on the screen of the user's finger positioned in accordance with information displayed on the screen.

6. The device of claim 5, wherein at least a portion of said determining means comprises:
   electronic circuitry mounted on the substrate.

7. The device of claim 1, wherein the substrate is a flex circuit.

8. A method of constructing an electronic device comprising an optical touch panel (OTP), the method comprising:
   mounting light emitting and light detecting devices on first and second peripheral portions of a substrate, respectively;
   mounting the OPT on a central portion of the substrate; and
   folding along first and second fold lines corresponding to the first and second peripheral portions of the substrate approximately 90 degrees with respect to a central portion of the substrate such that the light emitting and light detecting devices are positioned above a top surface of the OTP and further such that the light emitting and detecting devices are operably configured and aligned in respect of one another to permit a user's finger location thereon to be determined thereby.

9. The method of claim 8, further comprising:
   attaching a stiffener to the substrate inside at least one of the first and second fold lines.

10. The method of claim 8, wherein the stiffener is attached prior to mounting the OTP.

11. The method of claim 8, wherein the first peripheral portion opposes the second peripheral portion.

12. The method of claim 11, further comprising:
    after folding the opposing peripheral portions, aligning certain of the light emitting devices with certain of the light detecting devices.

13. The method of claim 12, wherein at least a portion of aligning comprises:
    inserting the electronic device into a housing.

14. The method of claim 13, further comprising:
    affixing the electronic device within the housing such that the housing covers the peripherally mounted components.

* * * * *

UNITED STATES PATENT AND TRADEMARK OFFICE
CERTIFICATE OF CORRECTION

PATENT NO. : 7,463,248 B2
APPLICATION NO. : 11/098714
DATED : December 9, 2008
INVENTOR(S) : Yee Pak Hong et al.

It is certified that error appears in the above-identified patent and that said Letters Patent is hereby corrected as shown below:

Column 4, Line 20, Claim 8, delete "OPT" and insert -- OTP --.

Signed and Sealed this

Twenty-sixth Day of October, 2010

David J. Kappos
*Director of the United States Patent and Trademark Office*